(12) United States Patent
Sarallo et al.

(10) Patent No.: US 6,381,466 B1
(45) Date of Patent: Apr. 30, 2002

(54) WIRELESS COMMUNICATION SYSTEM WITH TRUNKED SIGNAL VOTING

(75) Inventors: John C. Sarallo, Arlington Heights; William A. Felderman, Cary, both of IL (US)

(73) Assignee: Motorola, Inc., Schaumburg, IL (US)

( * ) Notice: Subject to any disclaimer, the term of this patent is extended or adjusted under 35 U.S.C. 154(b) by 1096 days.

(21) Appl. No.: 08/806,466

(22) Filed: Feb. 26, 1997

Related U.S. Application Data

(63) Continuation of application No. 08/342,475, filed on Nov. 21, 1994, now abandoned.

(51) Int. Cl.[7] .................................................. H04B 7/00
(52) U.S. Cl. ........................................ 455/517; 455/507
(58) Field of Search ............................... 455/34.1, 53.1, 455/54.1, 54.2, 56.1, 67.1, 15, 16, 17, 133, 134, 135, 8, 9, 450, 507, 517, 520, 524

(56) References Cited

U.S. PATENT DOCUMENTS

| | | | | |
|---|---|---|---|---|
| 4,013,962 A | | 3/1977 | Beseke et al. ............... 325/304 |
| 4,317,218 A | * | 2/1982 | Perry .......................... 455/54.1 |
| 4,850,032 A | | 7/1989 | Freeburg ....................... 455/51 |
| 4,995,095 A | * | 2/1991 | Lohrbach et al. ........... 455/67.1 |
| 5,060,240 A | | 10/1991 | Erickson et al. ............... 375/38 |
| 5,113,413 A | * | 5/1992 | Brown et al. ................ 455/133 |
| 5,131,010 A | * | 7/1992 | Derrenge et al. ............ 455/133 |
| 5,201,061 A | | 4/1993 | Goldberg et al. ........... 455/51.2 |
| 5,251,327 A | * | 10/1993 | Lenchik et al. ............. 455/53.1 |

* cited by examiner

Primary Examiner—Thanh Cong Le
(74) Attorney, Agent, or Firm—Frank M. Scutch, III

(57) ABSTRACT

A trunked wireless communication system (200) includes communication sites (220, 230, 240, 250), communication signal voters (214, 215), and a signal switch (216) intercoupled between the communication signal voters (214, 215) and the communication sites (220, 230, 240, 250). Each of the communication sites (220, 230, 240, 250) has selective trunked access to a signal voter (214, 215), thus providing flexibility in the operation of the wireless communication system (200). In a particular operation mode, the wireless communication system (200) can selectively route signals between the voters (214, 215) and communication sites (220, 230, 240, 250) to promote efficient reuse of communication resources.

16 Claims, 3 Drawing Sheets

WIRELESS COMMUNICATION SYSTEM WITH TRUNKED SIGNAL VOTING

This is a continuation of application Ser. No. 08/342,475, filed Nov. 21, 1994, and now abandoned.

TECHNICAL FIELD

This invention relates in general to trunked communication systems, and more particularly to trunked communication systems employing signal voting.

BACKGROUND OF THE INVENTION

Radio communication systems operating over a wide coverage area tend to be organized into geographic regions, each supported by a radio communication site. In a typical system, such as a trunked radio system, the communication sites are geographically dispersed and provide localized support for the transmission and receipt of wireless communication radio frequency (RF) signals for communication units, such as mobile and portable radio transceivers. Some prior art communication systems employ a simulcast broadcast methodology. Simulcast systems transmit identical messages from multiple communication sites, typically on the same communication channel, to increase a broadcast coverage region. Generally, these communication sites also function to receive transmissions from communication units for processing and possible retransmission.

A RF transmission from a communication unit may be received by multiple sites. Each site typically conveys received signals via a wired or wireless communication link to a controller site, which attempts to determine the original transmitted signal from the signals received through the various sites. Generally, the controller site assumes that signals received substantially simultaneously on a given radio frequency channel from the various sites are to be treated as originating from a single signal source via multiple signal paths. Many radio systems employ signal voters which reside at the controller site that receives the various signals from the receiving sites. A voter operates by selecting a signal from a receiving site which most likely represents a signal transmitted by the communication unit. Various methodologies have been employed within a voter to make this determination. For example, some systems select a transmission based on a received signal strength indicator (RSSI), which indicates the quality of the received signal based on received signal strength and/or other factors. The voter derives the best representation for the original signal transmitted, typically by selecting the signal received with the best signal quality.

FIG. 1 shows a typical prior art simulcast trunked radio communication system that employs voters as described above. The radio communication system 100 has an infrastructure which includes a controller 112, and signal voters 116, which support satellite sites 120 which having multiple operating RF channels. As in traditional systems employing voters, a voter 116 is provided for each operating RF channel. Each operating channel is coupled to a voter 116, such as by wired or wireless link. The controller 112 interfaces with the voters 116 to determine a preferred (or "voted") received signal for a particular operating channel, from versions of a signal received at multiple sites. The controller 112 also interfaces with the satellite sites for the transmission of signals, such as for simulcast operations.

There are certain problems associated with the typical prior art radio system configuration as depicted in FIG. 1. Generally, a dedicated voter per channel usually means that a particular channel is reserved throughout the system whenever that channel is used anywhere within the system. This limits the reuse of communication resources and imparts a rigidity in simulcast and other communication system operations. Additionally, when a voter experiences downtime, i.e., the voter is out of service, the use of that RF channel is precluded until the voter can be serviced.

It is desirable to increase the reliability and flexibility of radio communication systems incorporating satellite sites and signal voters. Therefore, there is a need for an improved approach to the design and implementation of such systems.

DETAILED DESCRIPTION OF THE PREFERRED EMBODIMENT

Figure 1:
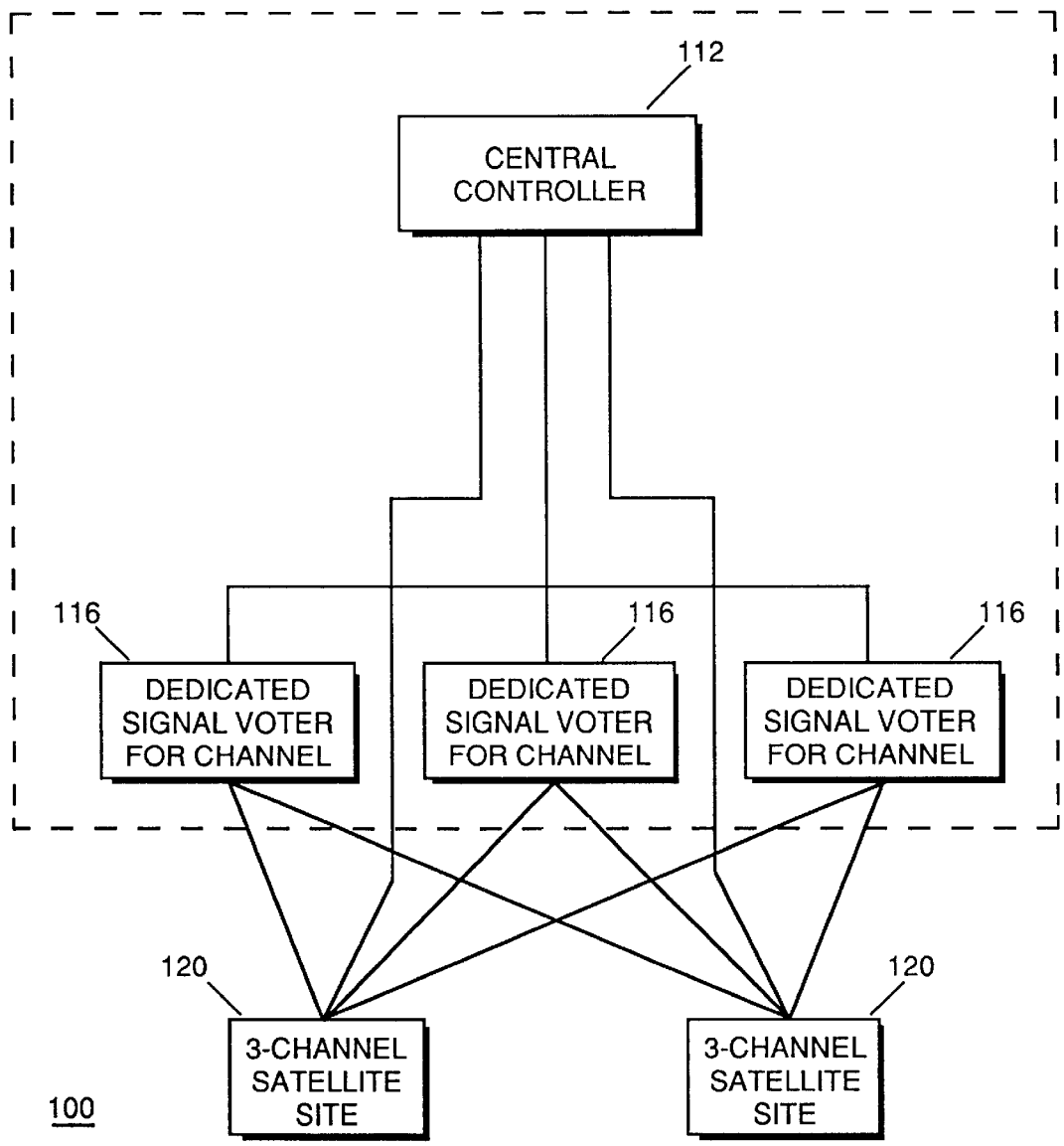
FIG. 1 is a block diagram of a prior art radio communication system.

While the specification concludes with claims defining the features of the invention that are regarded as novel, it is believed that the invention will be better understood from a consideration of the following description in conjunction with the drawing figures, in which like reference numerals are carried forward.

Generally, the present invention provides for a trunked wireless radio communication system which incorporates trunked voters to implement signal diversity reception. The present invention offers significant improvements over a prior art radio system with satellite sites, and which has a dedicated voter per communication channel. For example, under the present invention a trunked wireless system could be organized to facilitate the efficient use of system resources and to increase reliability within the system. System efficiency can be promoted by reusing channels in distinct geographic regions, and by implementing load demand management through the selective use of voters. System reliability can be increased by providing redundancy among voters to minimize downtime.

Figure 2:
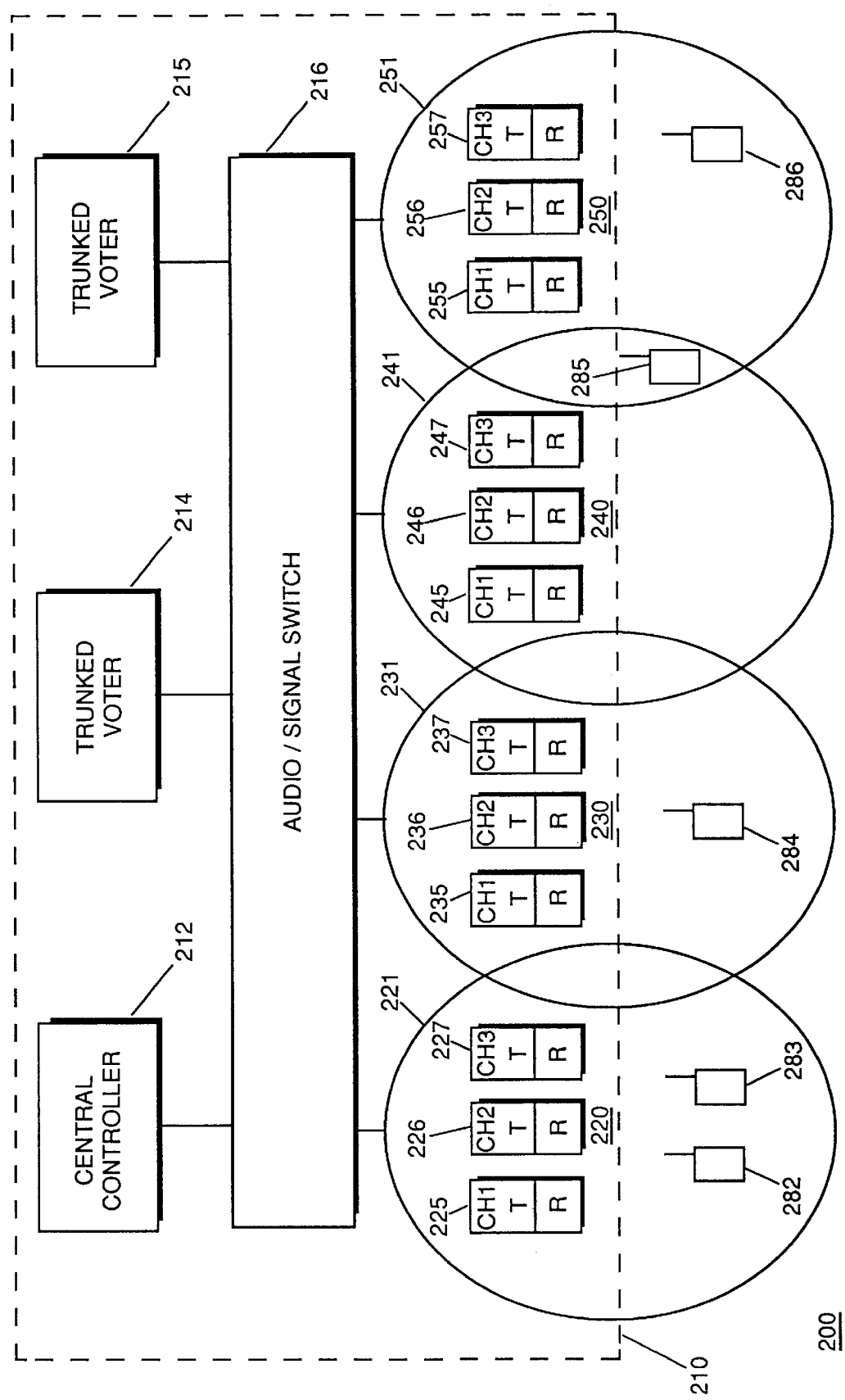
FIG. 2 is a block diagram of a radio communication system employing trunked voters, in accordance with the present invention.

Referring to FIG. 2, a wireless trunked radio communication system 200 suitable for simulcast operations, is shown in accordance with the present invention. The radio system 200 has a trunked system infrastructure 210 which includes multiple radio communication sites 220, 230, 240, 250 which interface to a controller 212 and multiple trunked voters 214, 215 through an audio or signal switch 216. The trunked system infrastructure 210 provides support for communication devices, such as radio transceivers 282, 283, 284, 285, 286. The radio transceivers affiliate with a particular site and interact with the communication system infrastructure 210 through that site. In the preferred embodiment, the sites are organized to share the same set of basic carrier frequencies for data and voice transmissions on traffic channels, such that the system 200 can be operated in a simulcast operation mode, and such that each site can operate as a satellite site. As shown, each site 220, 230, 240, 250 has a specific coverage area supported by radio base stations which comprises radio transcievers. Each site has a control channel CH1 with different carrier frequencies at each site, and two communication or traffic channels CH2, CH3 with carrier frequencies which are shared across the sites. Separate control channels at each site facilitates site affiliation procedures by a radio transceiver. Thus, a first site 220 has coverage area 221, a control channel supported by radio base station 225, and traffic channels supported by radio base stations 226, 227; a second site 230 has coverage area 231, a control channel supported by radio base station 235, and traffic channels supported by radio base stations 236, 237; a third site 240 has coverage area 241, a control channel supported by radio base station 245, and traffic channels supported by radio base stations 246, 247; and a fourth site 250 has coverage area 251, a control channel supported by radio base station 255, and traffic channels supported by radio base stations 256, 257. Generally, there is an overlap of coverage area of between two or more sites such that a particular location may be serviced by more than one site.

In simulcast mode, a signal is transmitted on multiple sites on the same carrier frequency in order to extend coverage area for that signal. When the system is operating with satellite sites, multiple sites receive a transmission from a transceiver on the same carrier frequency and transfer those signals to the infrastructure 210 for resolution. When signals are received from multiple sites representing the same transmission, the controller 212 through the signal switch 216, switches in a trunked voter 214, 215 to determine the signal transmitted.

A significant aspect of the present invention is the incorporation of the trunked voters 214, 215. Each voter 214, 215 may simultaneously process multiple versions of a common source signal each received at different points of reception, such as by the satellite sites. The number of received versions of a signal processed by a voter depends on the number of satellite sites, and also on the maximum number of versions of a common source signal which should be voted on at a given time. The voter compares the received versions of the source signal and determines a preferred or voted signal which best represents the source signal. The signal switch 216 operates under control instructions from the controller 212. Generally, the signal switch 216 receives a control instruction directing the signal switch 216 to route at least two versions of the common source signal as received at different points of reception to a particular trunked communication signal voter 214, 215. These received versions of the common source signal are routed to the particular trunked signal voter. At the signal voter, the contents of the received versions of the common source signal are used to provide the voted signal. The controller then programs the signal switch to route the voted signal to one or more sites for transmission across the coverage area. Generally, when operated in simulcast mode, the multiple sites 220, 230, 240, 250 are used to transmit the outbound signal in a manner well known in the art.

Unlike prior art communication systems having a dedicated voter per communication channel, in the present invention, the number of signal voters may vary, from fewer signal voters than there are communication channels or carrier frequencies, to more signal voters than the number of channels. The signal switch is intercoupled between the trunked signal voters and the communication sites, such that each of the sites, including each based station located therein, has selective trunked access to at least one communication signal voter. Selective trunked access to signal voters provides for flexibility in managing the radio communication system. Moreover, the use of multiple voters provides increase reliability through redundant operation of the voters, and provides for graceful system degradation when a voter becomes inoperable.

Figure 3:
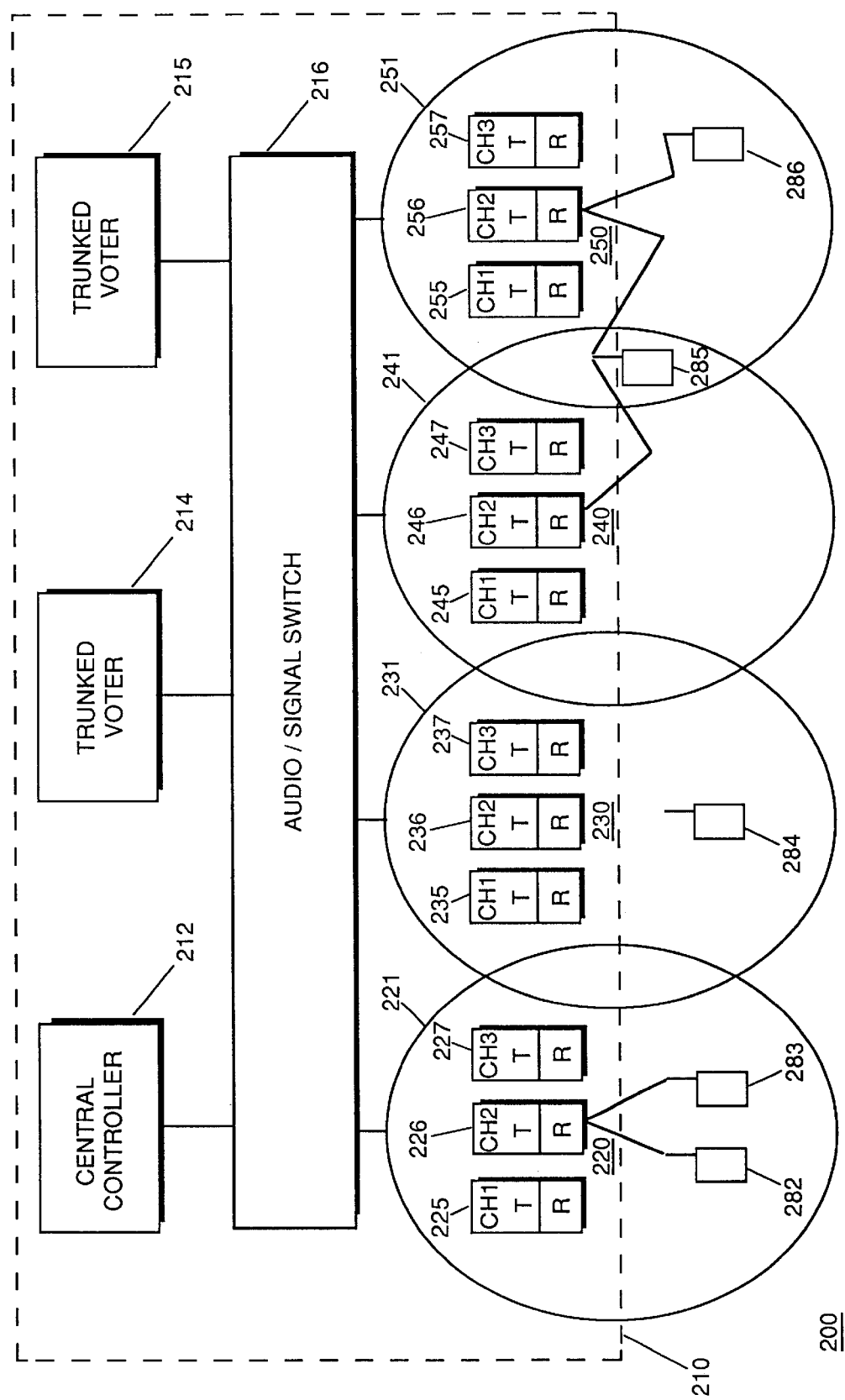
FIG. 3 is a block diagram of the radio communication system of FIG. 2, depicting the reuse of shared communication channels across a coverage area, in accordance with the present invention.

FIG. 3 highlights the potential reuse of shared communication channels across the coverage area of the radio communication system when operating a simulcast mode. In a first case, two transceivers 282, 283, are affiliated with the first site 220 and have formed a communication group. The transceivers 282, 283, communicate over CH2, one of the shared communication channels. In this first case, a decision is made by the controller 212 not to engage the services of one of the trunked signal voters 214, 215. Rather, the signal switch 216 is programmed to reroute communication signals originating at site 220, back to site 220 to facilitate the communications between the transceivers 282, 283. Additionally, because of potential of interference if another transceiver 284 operated on CH2, in an adjacent site 230, the controller blocks the use of CH2 on the adjacent site 230. Thus, CH2 on site 230 is not available for assignment to a separate call. In a second case, two transceivers 285, 286, have formed a communication group. One transceiver 285 is affiliated with the third site 240, and the other transceiver 286 is affiliated with the fourth site 250. However, because of the overlapping coverage areas between the sites 240, 250, the signals transmitted by transceiver 285 is received by the third site 240 and by the fourth site 250. In this second case, the controller 212 programs the signal switch 216 to route signals received on CH2 at sites 240, 250 to a selected trunked voter 214, such that the trunked voter 214 receives at least two versions of a common source signal when transceiver 285 is transmitting. The voter 214 generates a voted or preferred signal representing the common source signal, and the controller 212 instructs the signal switch 216 to route the voted signal to both sites 240, 250 for retransmission on CH2.

In the first case, signals are routed through a site without employing a signal voter when the communication group being serviced is operating on a single communication site. In the second case, the controller 212 selects a trunked signal voter from among the voters to form a voted signal for signals received from a communication group operating across multiple communication sites. Thus, under the present invention a simulcast system can be organized to promote reuse of shared communication channels by selective simulcasting at multiple sites. For example, a particular communication channel can be reused for separate communications by two or more communication groups across the coverage area. The controller 212 selects a trunked signal voter 214, 215 to service each communication group when operating across multiple communication sites. In simulcast mode, the signal switch 216 is set such that the voted signal is retransmitted only within those sites which are servicing the communication group. Optionally, sites adjacent to those sites identified as supporting a communication group may be brought on line to further support the communication group. For example, adjacent support sites may be desirable to ensure adequate support of priority communications by the communication group.

The present invention offers significant benefits over the prior art. By employing trunked signal voters, the radio system can be operated to promote efficient use of system resources. For example, selective simulcasting may be used to provide need-based coverage for communicating groups. Communication sites may be switched in as needed to function as satellite sites to enhance receive signal quality, by making more versions of a common source signal available to the trunked voters. As a trunked voter is only allocated as needed, there is no need to provide a dedicated voter per channel. Consequently, when a voter goes down, the system gracefully degrades without fully disabling complete sites or channels. Moreover, system reliability can be enhanced by incorporating as many trunked voters as needed.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A trunked wireless communication system, comprising:
a plurality of radio base stations;
a plurality of communication signal voters; and
a signal switch intercoupled between the plurality of communication signal voters and the plurality of radio base stations, such that each of the plurality of radio base stations has selective trunked access to each of the communication signal voters, the signal switch being operable to route respective versions of a common source signal from the plurality of radio base stations to any one of the plurality of communication signal voters.

2. The trunked wireless communication system of claim 1, wherein the plurality of radio base stations includes at least one transceiver.

3. The trunked wireless communication system of claim 1, wherein the plurality of radio base stations are located at a particular site.

4. The trunked wireless communication system of claim 1, wherein some of the plurality of radio base stations are located to have a first coverage area, and others of the plurality of radio base stations are located to have a second coverage area, wherein at least part of the first coverage area is different from the second coverage area.

5. A trunked wireless communication system having a predetermined number of carrier frequencies, comprising:
a plurality of radio base stations, wherein there is at least one radio base station for each of the carrier frequencies;
a plurality of communication signal voters, wherein there are fewer communication signal voters than there are carrier frequencies; and
a signal switch intercoupled between the plurality of communication signal voters and the plurality of radio base stations, such that each of the plurality of radio base stations has selective trunked access to any of the plurality of communication signal voters, the signal switch being operable to route respective versions of a common source signal from the plurality of radio base stations to any one of the plurality of communication signal voters.

6. A method of voting on a plurality of received versions of a common source signal, comprising the steps of:
receiving at a signal switch a control instruction directing the signal switch to route at least two received versions of the common source signal as received at different points of reception to a particular trunked communication signal voter;
selecting the particular trunked communication signal voter from a plurality of signal voters each selectable to process the at least two received versions of the common source signal;
routing the at least two received versions of the common source signal to the particular trunked communication signal voter;
at the trunked communication signal voter, using contents of the at least two received versions of the common source signal to provide a voted signal; and
providing the voted signal to the signal switch.

7. The method of claim 6, and further including the step of transmitting the voted signal through at least two separate sites.

8. The method of claim 6, and further including the step of simulcasting the voted signal through at least two separate sites.

9. A method of operating a wireless communication system, comprising the steps of:
interfacing a plurality of communication sites to a controller and a plurality of trunked signal voters, each of the plurality of trunked signal voters being selectable to process respective versions of common source signals from the plurality of communication sites;
operating a first communication group on a particular communication channel through at least one site selected from among the plurality of communication sites;
selecting, by the controller, a trunked signal voter from among the plurality of trunked signal voters to form a voted signal for signals received from the first communication group, when the first communication group is operating across multiple communication sites; and
routing received signals through the at least one site without employing a trunked signal voter, when the first communication group is operating on a single communication site.

10. A method of operating a wireless communication system, comprising the steps of:
interfacing a plurality of communication sites to a controller and a plurality of trunked signal voters, each of the plurality of trunked signal voters being selectable to process respective versions of common source signals from the plurality of communication sites;
operating a first communication group on a particular communication channel through at least one site selected from among the plurality of communication sites;
selecting, by the controller, a trunked signal voter from among the plurality of trunked signal voters to form a voted signal for signals received from the first communication group, when the first communication group is operating across multiple communication sites;
routing received signals through the at least one site without employing a trunked signal voter, when the first communication group is operating on a single communication site; and
reusing the particular communication channel on at least a second site, selected from among the plurality of communication sites, and different from the at least one site, for separate communications by a second communication group.

11. The method of claim 10, further comprising the step of:
selecting, by the controller, a second trunked signal voter from among the plurality of trunked signal voters to form a voted signal for signals received from the second communication group, when the second communication group is operating across multiple communication sites.

12. The method of claim 10, further comprising the step of:

blocking reuse of the particular communication channel on communication sites adjacent to the at least one site.

13. The method of claim 9, further comprising the steps of:

retransmitting the voted signal through the at least one site, but not through at least a second site of the plurality of communication sites; and operating a second communication group on the particular communication channel through the at least a second site of the plurality of communication sites, using a second trunked signal voter selected from among the plurality of trunked signal voters.

14. The method of claim 9, further comprising the steps of:

identifying a particular communication site supporting the first communication group; and operating through communication sites adjacent to the particular communication site to further support the first communication group.

15. A method of operating a wireless communication system for selective simulcast, comprising the steps of:

interfacing a plurality of communication sites through a signal switch to a controller and a plurality of trunked signal voters;

operating a first communication group on a particular communication channel through at least a first site selected from the plurality of communication sites;

selecting, by the controller, a first trunked signal voter from among the plurality of trunked signal voters to form a voted signal for signals received from the first communication group;

setting, by the controller, the signal switch such that the voted signal is retransmitted through the at least a first site, but not through at least some sites of the plurality of communication sites; and operating a second communication group on the particular communication channel through at least a second site different from the at least a first site, using a second trunked signal voter selected from among the plurality of trunked signal voters.

16. A wireless communication system, comprising:

a plurality of signal reception sites;

a plurality of signal voters; and a signal switch intercoupled between the plurality of signal reception sites and the plurality of signal voters, the signal switch being controllable to couple respective versions of received signals from any of the plurality of reception sites to any of the plurality of signal voters.

* * * * *